(12) United States Patent
Kung et al.

(10) Patent No.: US 9,747,788 B2
(45) Date of Patent: Aug. 29, 2017

(54) METHODS AND SYSTEMS FOR OPERATING A LOGICAL SENSOR NETWORK

(71) Applicant: Industrial Technology Research Institute, Chutung, Hsinchu (TW)

(72) Inventors: Hsiang-Tsung Kung, Lexington, MA (US); Dario Vlah, Cambridge, MA (US)

(73) Assignee: Industrial Technology Research Institute, Hsinchu (TW)

( * ) Notice: Subject to any disclaimer, the term of this patent is extended or adjusted under 35 U.S.C. 154(b) by 554 days.

(21) Appl. No.: 13/836,523

(22) Filed: Mar. 15, 2013

(65) Prior Publication Data

US 2013/0201877 A1 Aug. 8, 2013

Related U.S. Application Data

(62) Division of application No. 10/869,878, filed on Jun. 18, 2004.

(Continued)

(51) Int. Cl.
*G06F 15/16* (2006.01)
*G08C 19/16* (2006.01)
(Continued)

(52) U.S. Cl.
CPC ............ *G08C 19/16* (2013.01); *H04L 12/24* (2013.01); *H04L 12/66* (2013.01); *H04L 41/00* (2013.01); *H04W 84/18* (2013.01)

(58) Field of Classification Search
CPC ............... H04L 29/06; H04L 29/08072; H04L 29/08576

(Continued)

(56) References Cited

U.S. PATENT DOCUMENTS 5,971,597 A 10/1999 Baldwin et al.
6,052,784 A 4/2000 Day
(Continued)

FOREIGN PATENT DOCUMENTS

DE 695 16 541 5/2000
JP 2001-145174 5/2001
(Continued)

OTHER PUBLICATIONS

Office Action from the German Patent and Trademark Office for German Patent Application No. 10 2004 032 902.8-31, Jan. 4 2006 (10 pages).

(Continued)

*Primary Examiner* — Alan S Chou
(74) *Attorney, Agent, or Firm* — Finnegan, Henderson, Farabow, Garrett & Dunner LLP

(57) ABSTRACT

Methods and systems for operating a sensor network comprising a plurality of nodes and at least one resource, where a resource can be a sensing device (e.g., a camera or microphone) or other peripheral devices (e.g., a storage or recording system). In at least one embodiment of the present invention, at least one node in a network determines at least one resource available to it and the type of the resource or its capabilities. Based on the type or capabilities of the resource, the node associates with one or more logical node names and acquires instructions for performing at least one function.

2 Claims, 6 Drawing Sheets

Related U.S. Application Data

(60) Provisional application No. 60/485,544, filed on Jul. 7, 2003.

(51) Int. Cl.
  *H04L 12/24* (2006.01)
  *H04L 12/66* (2006.01)
  *H04W 84/18* (2009.01)

(58) Field of Classification Search
  USPC .................................................. 709/201, 228
  See application file for complete search history.

(56) References Cited

U.S. PATENT DOCUMENTS

| | | | |
|---|---|---|---|
| 6,208,247 B1 | 3/2001 | Agre et al. | |
| 6,604,140 B1 | 8/2003 | Beck et al. | |
| 6,665,717 B1 | 12/2003 | Aizono et al. | |
| 6,697,649 B1 | 2/2004 | Bennett et al. | |
| 6,735,630 B1 | 5/2004 | Gelvin et al. | |
| 6,748,278 B1 | 6/2004 | Maymudes | |
| 6,910,068 B2 | 6/2005 | Zintel et al. | |
| 6,983,306 B1 | 1/2006 | Sameshima et al. | |
| 2002/0029256 A1* | 3/2002 | Zintel et al. | 709/218 |
| 2003/0120840 A1* | 6/2003 | Isozu | H04L 67/16 710/36 |
| 2003/0140090 A1 | 7/2003 | Rezvani et al. | |
| 2003/0184645 A1 | 10/2003 | Biegelsen et al. | |
| 2013/0214937 A1 | 8/2013 | Petite et al. | |

FOREIGN PATENT DOCUMENTS

| | | |
|---|---|---|
| JP | 2002-369264 | 12/2002 |
| JP | 2003-122710 | 4/2003 |
| WO | WO 96/22644 | 7/1996 |
| WO | WO 96/22644 | 1/2006 |

OTHER PUBLICATIONS

Kasten, O. et al., "First Experiences with Bluetooth in the Smart-Its Distributed Sensor Network," Swiss Federal Institute of Technology, pp. 1-10, 2001.
Crossbow Technology, Inc., "Stargate Data Sheet." found at http:/www.xbow.com/Products/productsdetail.aspx?sid=85, Jun. 2004.
Heidemann, J. et al.. "Building Efficient Wireless Sensor Networks with Low-Level Naming," USC Information Sciences institute and Computer Science Department, University of California, Los Angeles, Oct. 2001., pp, 1-14.
Bulusu, N. et al., Scalable Coordination for Wireless Sensor Networks; Self-Configuring Localization Systems, Proceedings of the 6th International Symposium on Communication Theory and Applications (ISCTA '01), Ambleside, United Kingdom Jul. 2001, pp. 1-6.
He, T. et al., "Hermes: A Scalable Sensor Network Architecture for Robustness and Time-Energy Awareness." Department of Computer Science, University of Virginia, Apr. 2003, pp. 1-24.
Henderson, T.C. et al., "From Motes to Java Stamps: Smart Sensor Network Testbeds," School of Cornputino, University of Utah. Mar. 3, 2003 pm 1-13.
Horton, M. at al., "MICA: The Commercialization of Microsensor Motes," Sensor, Apr. 2002, pp. 1-8.
Manges, W.M. et al., "Wireless Sensor Network Topologies," Sensor; May 2000, pp. 1-8.
Xu, Y, "Energy-Aware Object Tracking Sensor Networks," Department of Science and Engineering, Pennsylvania State University, May 2003, pp. 1-2.
Tiny OS News Index, Jul. 3, 2003, "Smart Dust," found at httn://www.-bsac.eecs.berkeley.edu/-warneke/SmartDust/index.html., 9 pages.
Translation of Notification of Reasons for Rejection from the Japanese Patent Office, dated Dec. 5, 2006 (2 pages).
Office Action from the German Patent and Trademark Office for German Patent Application No. 10 2004 032 902.8-31, dated Jan. 4, 2006 (10 pages).
Kasten, O. et al,, "First Experiences with Bluetooth in the Smart-Its Distributed Sensor Network," Swiss Federal Institute of Technology, pp. 1-10, 2001.
Crossbow Technology, Inc. "Stargate Data Sheet." found at http://www.xbow.com/Products/productsdetails.aspx?sid=85, Jun. 2004.
Adjie-Winoto, W. et al., "The Design and Implementation of an Intentional Naming System," 17th ACM Symposium on Operating System Principles (SOSP '99), Kiawah island, S.C., Dec. 1999, pp. 186-201.
Heidemann, J. et al., "Building Efficient Wireless Sensor Networks with Low-Level Naming," USC Information Sciences institute and Computer Science Department, University of California, Los Angeles, Oct. 2001., pp, 1-14.
Levis, P., et al., "Mate: A Tiny Virtual Machine for Sensor Networks," Computer Science Division, University of California, Berkeley and Intel Research: Berkeley, Intel Corporation, pp. 1-11, 2002.
Bulusu, N. et al., Scalable Coordination for Wireless Sensor Networks, Seir-Configuring Localization Systems, Proceedings of the 6th International Symposium on Communication Theory and Applications (ISCTA '01), Ambleside, United Kingdom, Jul. 2001, pp. 1-6.
He, T. et al., "Hermes: A Scalable Sensor Network Architecture for Robustness and Time-Energy Awareness." Department of Computer Science, University of Virginia, Apr. 2003. pp. 1-24.
Henderson, T.C. et al., "From Motes to Java Stamps: Smart Sensor Network Testbeds," School of Computing, University of Utah. Mar. 3, 2003. pp. 1-13.
Ye, W., et al., "An Energy-Efficient MAC Protocol for Wireless Sensor Networks," Information Science Institute, University of Southern California and the Computer Science Department. University of California, Los Andeles. pp. 1-10, 2002.
Rodzevski, A. et al., "Wireless Sensor Network with Bluetooth," Intelligent Systems Group, School of Technology and Society, University of Malmo, Sweden, pp. 1-4, 2003.
Horton, M. et al., "MICA: The Commercialization of Microsensor Motes," Sensor, Apr. 2002, pp. 1-8.
Manges, W.M. et al., "Wireless Sensor Network Topologies" Sensor, May 2003, pp. 1-8.
Xu, Y., "Energy-Aware Object Tracking Sensor Networks," Department of Science and Engineering, Pennsylvania State University, May 2003, pp. 1-2.
Tiny OS News Index, Jul. 3, 2003, "Smart Dust," found at http://www.-bsac.eecs.berkeley.edu/-warneke/SmartDust/index.html., 9 pages.
Crossbow Technology, Inc., "WSC 100: Wireless Smart 1/0," Wireless Sensor Networks, p. 85, Jan. 2003.
Estrin, D. et al., "SCADDS," Information Sciences Institute, found at http://www//isi/edu/scadds, pp. 1-20, Jan. 2002.

\* cited by examiner

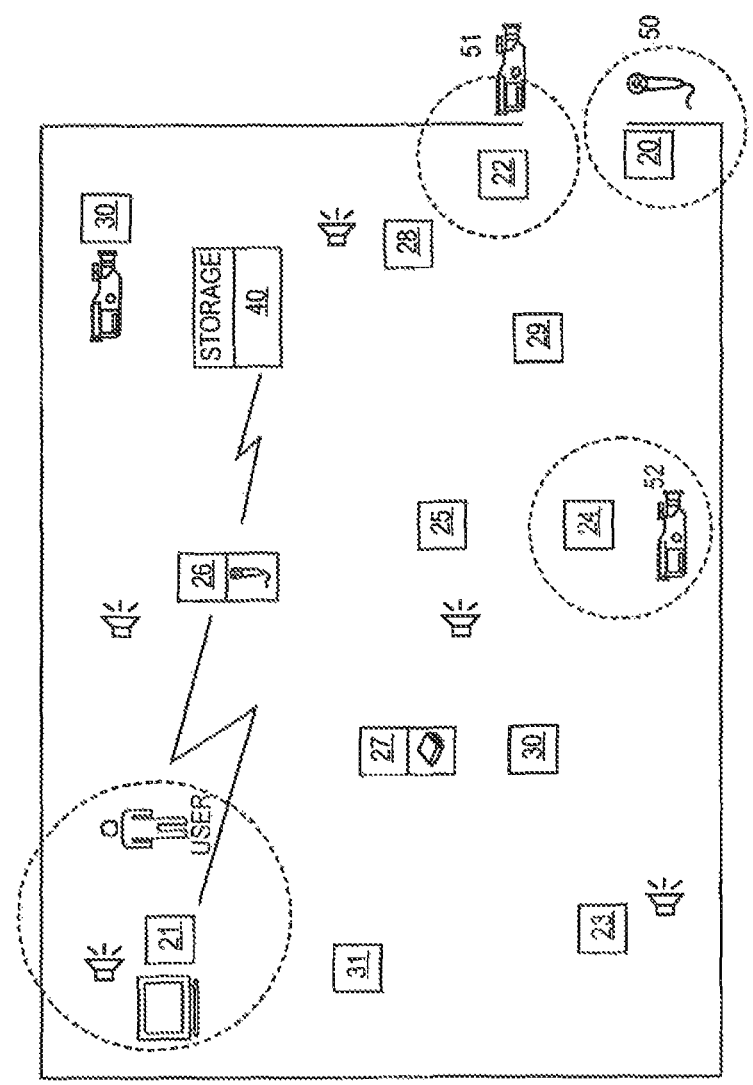

METHODS AND SYSTEMS FOR OPERATING A LOGICAL SENSOR NETWORK

RELATED APPLICATIONS

This is a division of application Ser. No. 10/869,878, filed Jun. 18, 2004, currently pending, which claims the benefit of U.S. provisional application No. 60/485,544, filed Jul. 7, 2003, all of which are incorporated herein by reference.

FIELD OF THE INVENTION

The present invention generally relates to sensor networks and, more particularly, to automatic programming of a network of devices with sensing, computing, and networking ability.

BACKGROUND OF THE INVENTION

The availability of intelligent sensors and micro-sensors has furthered the development of wireless sensor networks. Wireless sensor networks have virtually limitless application particularly in situations where environmental monitoring is likely to provide useful information. Some examples of applications of sensor networks include remote healthcare, farming, environmental compliance, construction, condition-based maintenance, military surveillance, and medical disasters.

Conventional sensor networks struggle with a variety of issues. To be reliable, conventional sensor networks often must be highly redundant, that is, deploy sensors in large numbers so that if one or more sensors are rendered inoperable, necessary information may still be reliably collected and reported. With the advances in wireless networking, highly redundant systems have become more feasible, but may become costly to deploy or operate.

In addition, network routing of collected information remains a serious concern in most network architectures. In any network where all nodes cannot reach all other nodes in a single hop, a repeating mechanism is required. Furthermore, in sensor networks where nodes can come and go frequently, how a network responds to a failure impacts performance and reliability of the network. In general, networks that are able to dynamically reconfigure in the event of a node failure are desired particularly, in a sensor network, where connections can change quickly as the radio frequency (RF) environment changes, and battery power of nodes may be depleted in a unpredictable manner.

In conventional sensor networks, such as a camera surveillance system using multiple cameras as sensors, the cameras may be fixed and, once the location of the cameras were known to an intruder, the effectiveness of the surveillance system can be compromised. Furthermore, moving the cameras often requires costly system reconfiguration.

Wireless technologies allow for the deployment of sensor systems where some or all of the sensors may be untethered and/or mobile. Furthermore, in many applications, many or all of the sensors may need to operate largely unattended, as the sensors may be deployed in physically inaccessible or hazardous locations. For example, the sensors in a sensor network used to monitor military situations may be deployed in hostile enemy territory or sensors used to measure the levels of toxic chemicals may be deployed in areas with harmful levels of toxic chemicals. For at least these reasons, much research has been dedicated to developing wireless sensor networks that are pervasive, self-configuring, flexible, and programmable.

Since sensor data is associated with the physical location of the sensor, determining the spatial coordinates of a sensor is important. Indeed, many efforts to date have focused on perfecting localization techniques. Constraints on cost, size, or power as well as the line-of-sight constraint may preclude the use of global positioning techniques, such as GPS. In this case, self-configuring sensor networks would require to use other localization methods, which could, for example, involve the use of sensors in the network itself.

Traditional sensor networks suffer from a limitation that they are generally deployed with one application in mind and therefore with highly specialized software and/or configuration expectations. For example, separate sensor networks are deployed for home safety, home security surveillance, monitoring of infants, and home care of the elderly, in spite of the fact that these systems share, to a large extent, the same hardware and software. Even for the same application, upgrades of sensor nodes and their functionalities often incur costly system reconfiguration and software changes.

What is needed is methods and systems that allow the same sensor networks to support a variety of applications when this is feasible and to accommodate changes and upgrades of the system in a simple and low-cost manner. For example, the network should support automatic configuration and incorporation of new sensors and devices. What is further needed is a new sensor network programming environment that enables a sensor application programmer to program a sensor network in a network topology and resource independent manner.

SUMMARY OF THE INVENTION

Accordingly, one embodiment of the present invention is directed to a method and system for operating a sensor network comprising a plurality of nodes and at least one resource, where a resource can be a sensing device (e.g., a camera or microphone) or other peripheral devices (e.g., a storage or recording system). In accordance with one embodiment of the present invention, at least one node in a network determines at least one resource available to it and the type of the resource. Based on the type of the resource, the node associates with one or more logical node names. Based on the logical node name, the node acquires instructions for performing at least one function.

Another embodiment of the present invention is a processor comprising a memory storing instructions for enabling the processor to determine that at least one resource is available to it; determine a type of the at least one available resource; associate the processor with one or more logical node names based on the determined type, each logical node name associated with a type of resource; and acquire instructions for performing at least one function, the instructions provided determined based on the one or more logical node names.

BRIEF DESCRIPTION OF THE DRAWINGS

The accompanying drawings, which are incorporated in and constitute a part of this specification, illustrate several embodiments of the invention and together with the description, serve to explain the principles of the invention. In the drawings:

FIG. 6 shows the path of communication of information from storage node 40 to node 21, which in this example is associated with a user.

DETAILED DESCRIPTION OF THE INVENTION

Reference will now be made in detail to the present embodiments of the invention, examples of which are illustrated with reference to the accompanying drawings. Wherever possible, the same reference numbers will be used throughout the drawings to refer to the same or like parts.

Exemplary Network

A sensor network consistent with the present invention comprises a plurality of nodes and at least one resource. A resource may be a sensor, such as a microphone, gas detector, light detector, motion detector, listening device, ultrasound device, or thermometer, or a peripheral device, such as a device used for storage, display, playing or recording of audio, video, or images. A resource may be embedded within a node or associated with the node. A resource embedded within a node may be physically situated within the physical confines of the node or physically attached to the node. A resource associated with the node may be physically remote from the node, but may be operationally connected or capable of communicating with the node, such as by wireless radio communications.

Figure 1:
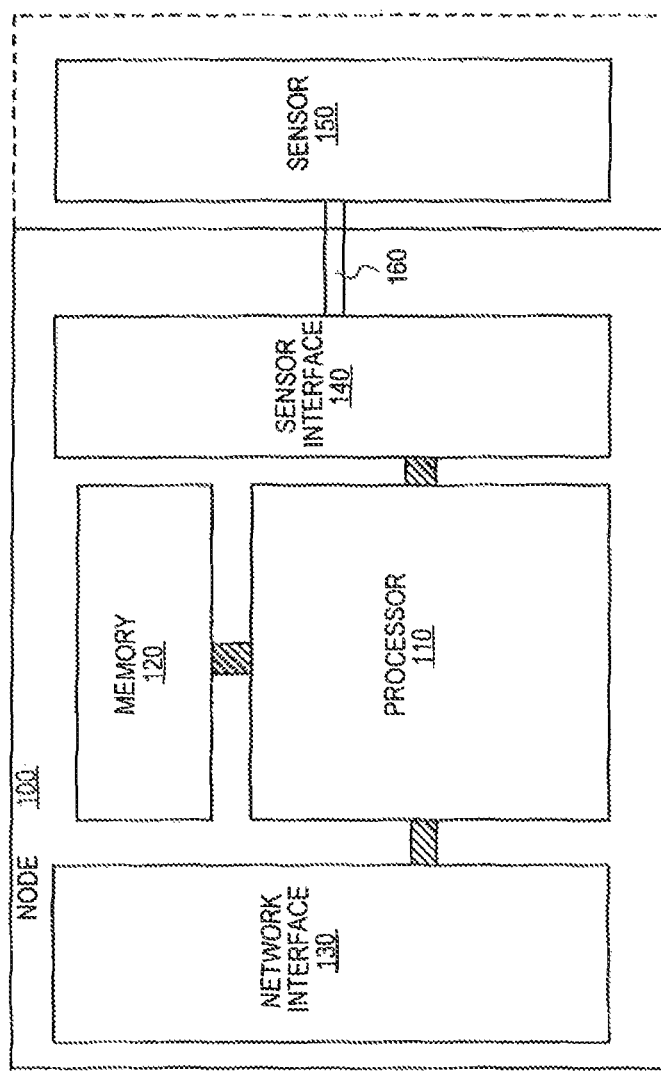
FIG. 1 shows one exemplary configuration of a node 100 consistent with the present invention.

FIG. 1 shows one exemplary configuration of a node 100 consistent with the present invention. An exemplary node 100 may comprise, for example, a processor 110, memory 120, a network interface 130, and a sensor interface 140. Node 100 will likely also include a power source (not shown), which may be, for example, standard electrical power, solar power, or battery. As mentioned above, node 100 may optionally comprise a sensor 150 embedded within node 100 or connected via communications link 160, where communications link 160 may be, for example, a bus. Alternatively, node 100 may optionally comprise a sensor 150 physically remote from node 100 but connected via communications link 160, where communications link 160 may be, for example, wireless communications.

In exemplary embodiments consistent with the present invention, one or more of the nodes may be a micro-controller-class node. For example, processor 110 in a micro-controller-class node may comprise, for example, a 64 MHz, 32-bit processor such as the ARM7 processor sold by ARM Ltd. or other similar class processors. Memory 120 may be RAM, flash memory, or a combination of RAM and flash. Memory 120 may store system software for operating node 100, network protocol stacks, network routing protocols, and other software or drivers for operating resources. Memory 120 may optionally store other software for use by the network, such as application code or software for discovering the resources in the network.

Other nodes may be smaller, low-power nodes such as the "mote" developed by the University of California at Berkeley (UCB). The UCB motes are very tiny computers, ranging in size from mere millimeters to a few centimeters, equipped with sensors to collect information about their environment. Current motes, for example, measure approximately 2 millimeters by 2.5 millimeters and comprise an 8-bit processor with 128 Kb of flash memory, 4 Kb system RAM, communications devices, such as an FSK radio transmitter with an RF range of tens of meters, a low-power source, and sensors, among other things. Motes are capable of running TinyOS, an event-driven multithreading operating system, and applications written in NesC, a C-like language also developed by the developers at UCB. In certain embodiments, one or more of the nodes may be Smart Dust, another smart node developed at UCB that is even smaller than a mote.

Another suitable example of a node 100 may be a JStamp, offered by Systronics. A JStamp is a physically small device measuring only 1 by 2 inches that comprises a 32-bit controller, 2 Mb of memory, and native execution Java® hardware that is power efficient but computationally powerful. Software may be developed in Java and loaded onto the nodes.

Network interface 130 in node 100 includes any available means for communicating with other nodes and resources in the network. In certain embodiments of the present invention, some or all of the nodes may communicate using wireless technology based on physical-layer standards. For example, devices capable of communicating using the Bluetooth RF standard may have a radio frequency chip compatible with the Bluetooth technology.

Nodes in a wireless sensor network consistent with the present invention may communicate with one another at layers above the physical layer, using a medium-access control (MAC) protocol such as, for example, Carrier Sense Multiple Access (CSMA), IEEE 802.11, or their equivalents.

Sensor interface 140 may be any standard interface allowing sensor 150 to communicate information to or receive information from processor 110 and/or memory 120. For example, if sensor 150 is physically embedded or otherwise connected to node 100, sensor interface 140 may be a standard bus and accompanying protocols. If, however, sensor 150 remotely located from node 100, sensor interface 140 may a wireless interface and accompanying protocols. In some embodiments, sensor interface 140 may include an analog to digital (A/D) converter and/or a multiplexer.

One skilled in the computer arts will appreciate that other suitable, even smaller, computing devices may also be appropriate in some embodiments. Further, node 100 may be a device such as a telephone, personal digital assistant (PDA), RFID reader, or other handheld computing devices.

As mentioned above, a sensor network consistent with the present invention comprises one or more nodes with one or more resources. Some or all of the nodes 100 in the network may also comprise software, such as drivers, for interfacing with one or more resources. Alternatively, some or all of nodes 100 may obtain software for interfacing with individual resources dynamically over the network. Such software may be downloaded to node 100, for example, when a node 100 detects that it has the opportunity to associate with a particular resource in its vicinity.

Logical Network Operation

As mentioned above, a sensor network consistent with the present invention comprises one or more nodes with one or more resources. In at least one embodiment, all of the nodes are geographically dispersed throughout a monitored area, such as a home, warehouse, or a hospital. Users of the network may be mobile, that is, a user may be moving around the area. Each node in the network need not know the environment in advance, but may determine the network environment upon activation or in the course of operation. In certain embodiments of the present invention, some or all of the nodes in the network associates with a logical node name. In addition, some or all of the nodes may be capable of configuring dynamically their functionalities based on their associated logical node names. The use of logical-level programming allows programs to be written using logical node names, such as "camera," "microphone," or "user," without needing to know the exact physical location of any particular device.

The Internet and most data networks use network addresses, such as IP Address 208.154.23.54. These addresses, however, have no correlation to the node's spatial address, that is, the latitude, longitude, altitude or x,y,z coordinates. For certain embodiments, one may not need to know the spatial address of the responding node. However, if spatial information is needed, the spatial address of any node may be determined by any one of a number of known methods. For example, in some embodiments, one or more of the nodes may have a means for determining the node's spatial address, such as, for example, a Global Positioning System (GPS) device. If any particular node does not have a GPS device, it may be able to determine its own position by communicating with other nodes that do.

Figure 2:
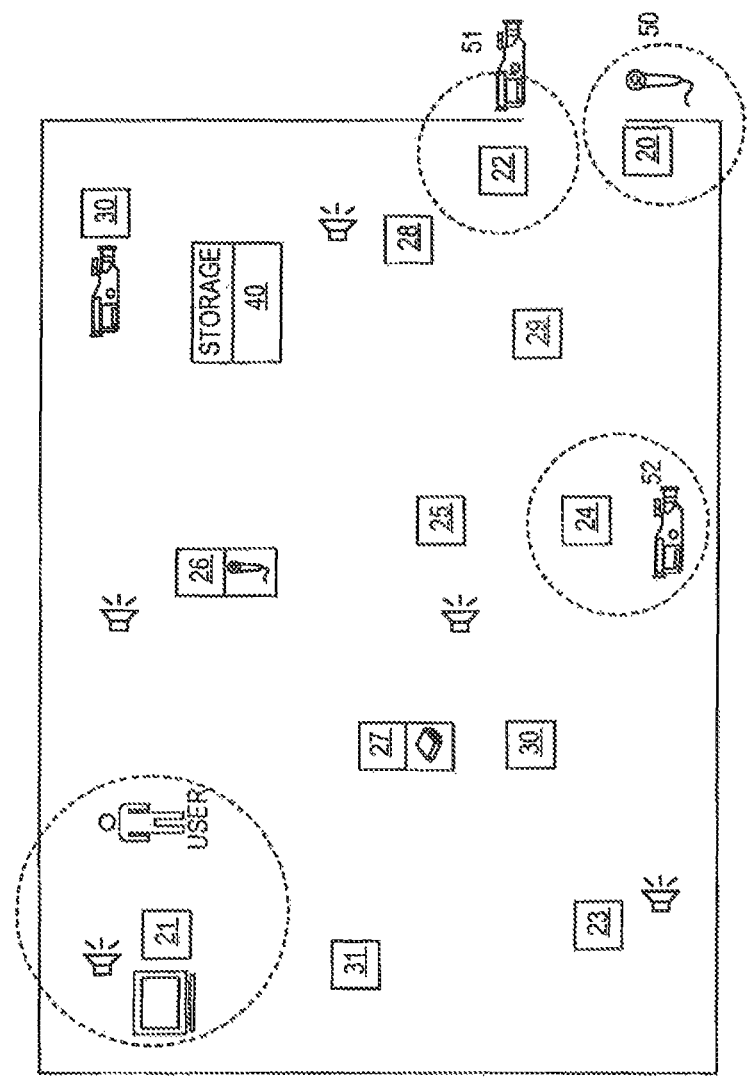
FIG. 2 shows a network of nodes and resources consistent with the present invention.

One exemplary embodiment of the present invention will now be described with reference to FIG. 2, which shows a network of nodes and resources consistent with the present invention. FIG. 2 may represent, for example, an electronically-monitored home, warehouse, or hospital.

In the example shown in FIG. 2, nodes 20, 21, 22, 23, and 24 may be micro-controller-class nodes. Nodes 26 and 27 may be motes with embedded resources. Node 26, for example, may be a mote with an embedded microphone and node 27 may be a mote with an embedded temperature sensor. Node 40 may be, for example, a micro-controller-class node that will act in the example as a storage node. In FIG. 2, a "user" shown in the vicinity of node 21.

Figure 3:
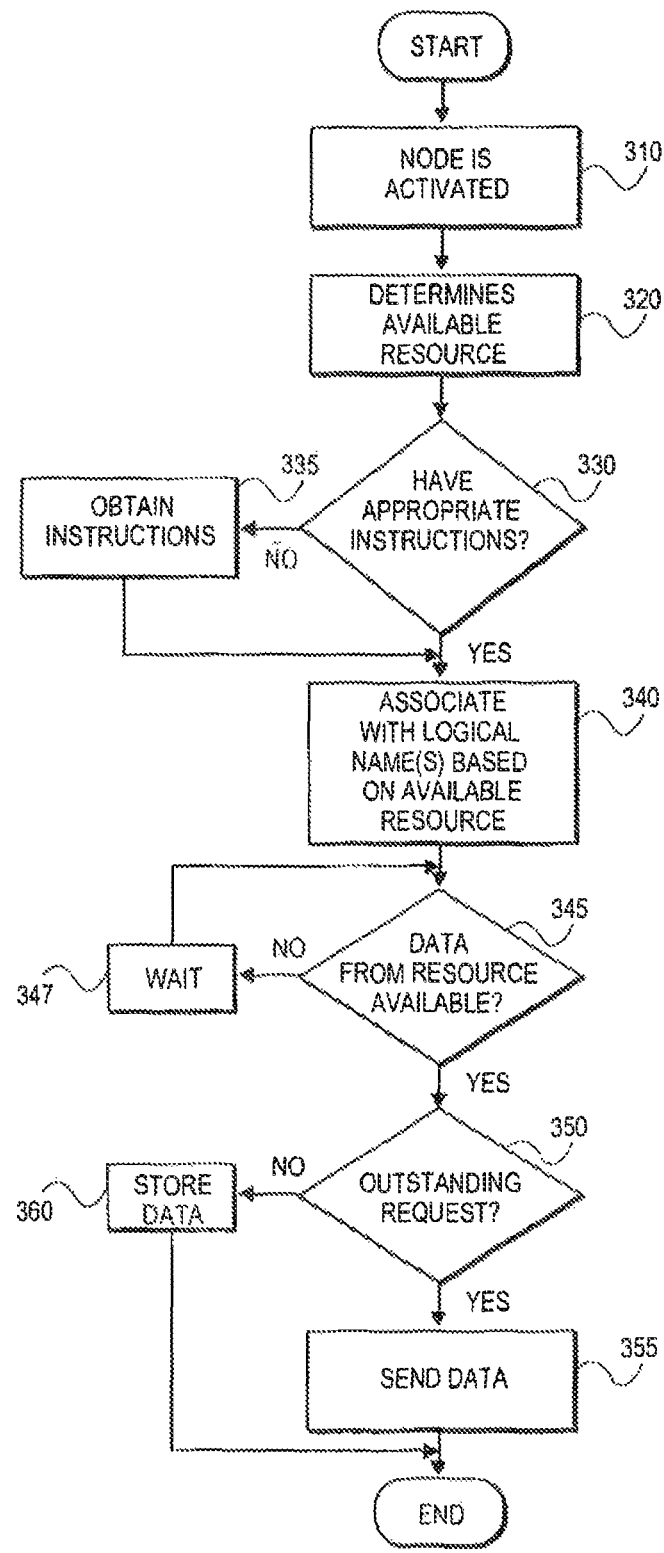
FIG. 3 illustrates the steps of an exemplary method for operating the network shown in FIG. 2.

FIG. 3 illustrates the steps of an exemplary method for operating the network shown in FIG. 2. One or more of the nodes in FIG. 2 are activated (step 310). Activation of one or more nodes may occur, for example, upon initial activation of the network as a whole or when an event occurs. For example, one or more of the individual nodes may remain inactive, even "sleep", for long periods of time to conserve energy. Such nodes may be awakened, or activated, when an event is detected. In some embodiments, one or more of the nodes may be set a timer and activate itself and/or other nodes at a certain time. In addition, some number of nodes in the network may be organized as a "piconet" that may put a group of neighboring nodes into a synchronized sleep.

Upon activation, a node determines the resources, or resources, available to it. For example, node 20 may sense that microphone 50 is in close proximity, and node 22 may sense that camera 51 is in its vicinity. Node 21 may sense that a user wearing or carrying a sensor is in its vicinity or the user may register with node 21 by interacting with a node, such as, for example, by the user pushing a button, the user speaking to the node, or the node detecting the user by image recognition techniques.

A node may determine the resources available to it by, for example, broadcasting a notice that it is available to communicate and waiting to see who answers. In other embodiments, a node may determine the resources available to it by just listening to broadcasts sent by resources.

In any event, when a node detects a resource, it determines if it has the necessary software to communicate with the particular resource (step 330). For example, node 20 determines that microphone 50 is in close proximity and wishes to communicate with it. Node 20 then determines if it has the necessary software to communicate with microphone 50. If it does not, node 20 may obtain such software over the network (step 335). Node 20 may, for example, broadcast a request for a driver for microphone 50 over the network. Node 20 may then get a response to the request which contains an address or information that would allow node 20 to obtain the appropriate driver. In certain embodiments, node 20 may be controlled remotely, that is, instructions or software for operating node 20 may be resident somewhere on the network other than on node 20 but may be used to operate node 20.

After a node has activated and determined one or more resources available to it, it may broadcast to one or more other nodes or the entire network announcing its role or capabilities (step 340). For example, node 21 may associate with the logical node name "user," and announce itself to the network as "user," indicating that the user has registered with node 21 or that node 21 is otherwise capable of communicating with the user. Likewise, node 20 may associate with the logical node name "microphone" and broadcast to the network a message indicating that it has associated with a microphone.

Nodes may also associate with logical node names for the purpose of indicating a role a node would like to assume or a type of information a node would like to receive, if or when such role or information becomes available. For example, node 21 may also associate itself with the logical node name "display," indicating not only that it has a display but also that it would like to receive image data from a camera or video camera when or if it becomes available.

If a node associates with a logical node name, data is available from the resource (step 345), and a request for the type of information is outstanding (step 350), the node may forward the received information immediately to the requesting node (step 355).

For example, with reference to FIG. 2, node 20 may determine that microphone 50 is available to it and associate with the logical node name "microphone." If microphone 50 has detected sound such as, for example, a knock at the door, this data is available for distribution to other nodes who request such information. If other nodes have requested with the logical node name "speaker," for example, thereby indicating a desire and/or capability to use audible data, node 20 may send such information to the nodes associated with logical node name "speaker." Node 20 may also broadcast to the network that it has sound that it wishes to convey to nodes requesting sound.

In certain embodiments, node 20 may also, for example, check to see if a user has registered with the network. A "user" of a network in a home monitoring example may be, for example, a home owner who may wish to be notified of any sounds detected by microphones in the home monitoring system.

If, however, no data is yet available from the resource, the node may simply wait (step 347). If data is available from the resource, but there is no outstanding request for that type of data, the data may be stored (step 360). For example, microphone 50 may detect a knock at the door, and node 20 may be associated with the logical node name "microphone," but there may be no nodes associated with the logical node name "speaker" and no nodes associated with the logical node name "user." In this case, the data may be stored in node 40 until such time as this type of data is requested. When a user returns home, for example, and is again associated with the network as a "user," the user may then be able to recall the data from storage.

In certain embodiments, the nodes in the network may also be dynamically programmed to collaborate in providing information. For example, when the network detected that node 20 assumed the role of a microphone, node 20 could be dynamically programmed to carry out the action that, if a sound is detected, one or more of the cameras nearby should be activated to collect corresponding video or still pictures. For example, if the microphone detects a sound, node 20 may ask any node registered with logical node name "camera" to send video or still images to a node with logical node name "user." If, as in this example, node 22 has registered with the logical node name "camera," node 22 may send video to node 21.

Figure 4:
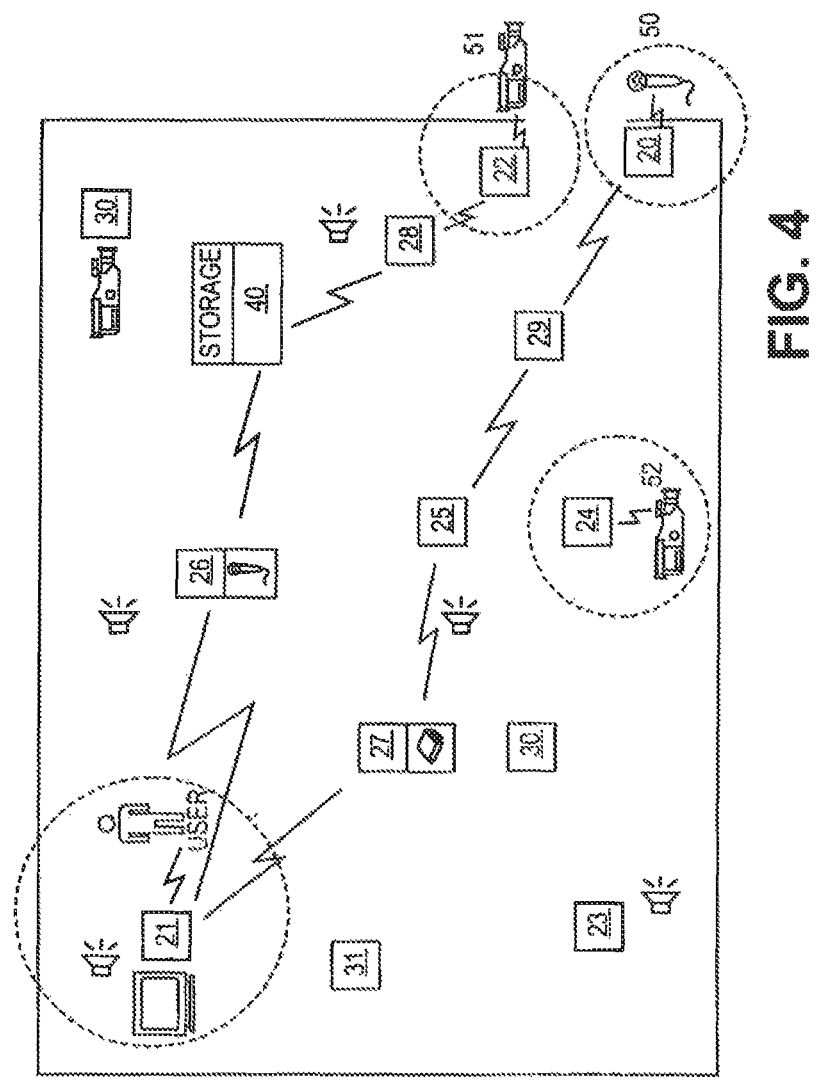
FIG. 4 shows the path of communication of information from nodes 20 and 22 to a node 21 associated with a user.

FIG. 4 shows the path of communication of information from nodes 20 and 22 to a node 21 associated with a user which may occur in the type of exemplary embodiment described above. If a user is associated with node 21, node 20 transmits the sound to node 29, which in turn transmits it to node 25, which transmits it to node 27 and ultimately to node 21, where it was delivered to the user. Similarly, video data collected from camera 51 may be transmitted to node 22, which may transmitted to node 21, via nodes 28, 40, and 26. In this example, if any of the nodes in either of those paths fails or is otherwise not available, the information may be routed to node 21 through alternate paths. Conventional routing protocols for ad-hoc networks can be used in computing these paths.

If, in the example shown in FIG. 2 and described above, more than one resource is associated with a particular logical node name, the network may use a process to determine which of the resources is best suited to respond. For example, if camera 52 activates and also associates with the logical node name "camera," two resources have registered as cameras, camera 51 associated with node 22 and camera 52 associated with node 24. In this case, node 20 may be programmed to determine, for example, which of the cameras best suits its needs. If it is determined that camera 51 better suits its needs, for example, if it is closer, has better resolution, is at a better angle, or in any other way improves upon the quality of information available regarding the event, node 20 may notify the network that the video sent to the user should come from camera 51.

In many applications, any of the nodes, including the "user," may be mobile. A mobile user may, for example, move out of range of node 21 and into the range of node 26. If node 21 senses that the user is no longer in its range (by, for example, detecting that it can no longer communicate with a sensor attached to or carried by the user), node 21 may broadcast to the network that the user is unavailable. In this case, there may be no registered user until the user moves into the range of another node or registers at another node. Alternatively, node 26 may automatically detect that the user has moved into its range and it may broadcast that the user is associated with node 26. If node 21 has not yet published that the user is unavailable, the broadcasting by node 26 that it has contact with the user may trigger the network to delete the association of the user with node 21.

During the period that the user, or any node, is unavailable, data collected by a resource when no request for such data is pending may be stored. For example, if nodes 20 or 22 have data and determine that no user is associated with a node in the network, nodes 20 or 22 may store the data. In a network consistent with the present invention, one or more of the nodes in the network may have already associated with a logical node name like "storage," indicating the node's capability to assume the role of storing data. If so, nodes 20 or 22 may store the data at one or more nodes associated with the logical node name "storage." In certain embodiments, and depending on the network protocol, nodes 20 or 22 may broadcast a request for storage, wait for an acknowledgment, and may transmit the data to the storage location.

Figure 5:
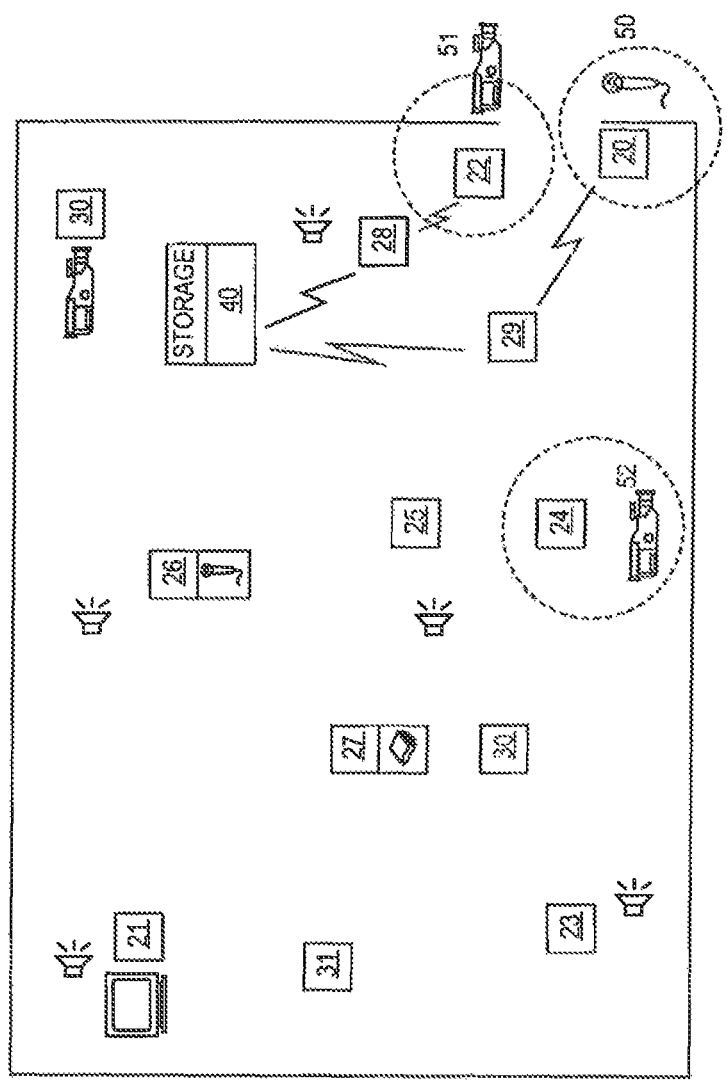
FIG. 5 shows the path of communication of information from nodes 20 and 22 to a node 40, a storage node.

In FIG. 5, for example, node 40 may have associated with the logical node name "storage" and/or responded to nodes 20 and/or 22 that it is capable of storing. FIG. 5 shows one exemplary path of communication of information from nodes 20 and 22 to storage node 40.

If data is stored at node 40 and a request for the data is later received or published, the data may be forwarded to the requester from storage node 40. For example, as shown in FIG. 6, a user may move back into the range of node 21. Node 21 may sense that the user is back in its range (by, for example, detecting that it can communicate with a sensor attached to or carried by the user) and may rebroadcast to the network that the user is available. Storage node 40 may then transmit information, via node 26, to node 21, as shown in FIG. 6.

Above it was discussed that each of the nodes in the network may establish its associations upon activation, which may happen upon initial activation of the network. Each of the nodes in the network may re-establish or establish its associations at other times as well. For example, one or more of the nodes may periodically reevaluate and rebroadcast its associations. In at least one embodiment, one or more nodes may be triggered to reevaluate and rebroadcast its associations upon a change in status or configuration of the network. Rebroadcasting allows nodes in the network to update the paths available to reach it.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A method of operating a network comprising a plurality of programmable network nodes and resources, the method comprising:

determining by a first programmable network node that it is associated with a user;

broadcasting by the first programmable network node to the network a logical node name associated with the user, the logical node name being assigned to the first programmable network node based on its association with the user after determining that it is associated with the user;

associating a second programmable network node with a first resource;

making available to the second programmable network node a first set of instructions for allowing the second programmable network node to control the first resource;

receiving, by the second programmable network node, sensory input via the first resource;

determining, by the second programmable network node based on its receiving the logical node name associated with the user from the first programmable network node, that a request associated with the user for sensory input is outstanding; and transmitting, by the second programmable network node responsive to determining that a request associated with the user is outstanding, the sensory input to the first programmable network node via one or more programmable network nodes of the network, based on the first programmable network node being assigned the logical node name associated with the user;

wherein when a third programmable network node determines that it is associated with the user, rebroadcasting, by the third programmable network node, to the network the new association of the third programmable network node with the user.

2. A method of operating a network comprising a plurality of programmable network nodes and resources, the method comprising:

registering one or more programmable network nodes with at least one logical node name, each of the at least one logical node names being associated with a type of resource;

broadcasting, by a first programmable network node, to the network of programmable network nodes, a first logical node name registered for the first programmable network node, the broadcasting indicating to the network a request to receive sensory input suitable for functionality associated with the first logical node name from any other programmable network node associated with a first resource capable of providing the requested input;

receiving by a second programmable network node associated with the first resource, sensory input from the first resource;

determining, by the second programmable network node based on its receiving the first logical node name broadcast by the first programmable network node, that a request by the first programmable network node for the sensory input from the first resource is outstanding; and transmitting, from the second programmable network node, the received sensory input to the first programmable network node based on the determining.

* * * * *

UNITED STATES PATENT AND TRADEMARK OFFICE
CERTIFICATE OF CORRECTION

PATENT NO. : 9,747,788 B2
APPLICATION NO. : 13/836523
DATED : August 29, 2017
INVENTOR(S) : Hsiang-Tsung Kung et al.

It is certified that error appears in the above-identified patent and that said Letters Patent is hereby corrected as shown below:

On the Title Page

Item (73), Assignee: "Industrial Technology Research Institute, Hsinchu (TW)" should read
-- Industrial Technology Research Institute, Hsinchu (TW) and Hsiang-Tsung Kung, Hsinchu (TW) --

Signed and Sealed this
Tenth Day of April, 2018

Andrei Iancu
*Director of the United States Patent and Trademark Office*